United States Patent
Hu et al.

(10) Patent No.: US 8,650,351 B2
(45) Date of Patent: Feb. 11, 2014

(54) ELECTRICAL POWER DISTRIBUTION SYSTEM FOR A VEHICLE

(75) Inventors: Hawking Hu, Shanghai (CN); Xiaojun Yang, Shanghai (CN); Junjie Xu, Shanghai (CN)

(73) Assignee: Delphi Technologies, Inc., Troy, MI (US)

( * ) Notice: Subject to any disclaimer, the term of this patent is extended or adjusted under 35 U.S.C. 154(b) by 63 days.

(21) Appl. No.: 13/175,003

(22) Filed: Jul. 1, 2011

(65) Prior Publication Data
US 2012/0005393 A1  Jan. 5, 2012

(51) Int. Cl.
*G06F 13/20* (2006.01)
*G06F 13/38* (2006.01)

(52) U.S. Cl.
CPC .................... *G06F 13/385* (2013.01)
USPC .............. 710/313; 710/106; 710/62

(58) Field of Classification Search
USPC .............. 710/300–317, 8–19, 62–64, 72–73, 710/105–106
See application file for complete search history.

(56) References Cited

U.S. PATENT DOCUMENTS

| | | | |
|---|---|---|---|
| 6,220,876 B1 | 4/2001 | Avila et al. | |
| 6,468,091 B2 | 10/2002 | Roussel et al. | |
| 7,727,022 B2 | 6/2010 | Polehonki et al. | |
| 2003/0216841 A1 | 11/2003 | Hashimoto et al. | |
| 2005/0245272 A1 | 11/2005 | Spaur et al. | |
| 2005/0278081 A1 | 12/2005 | Mayer et al. | |
| 2007/0228826 A1 | 10/2007 | Jordan et al. | |
| 2007/0288166 A1 | 12/2007 | Ockerse et al. | |

OTHER PUBLICATIONS

International Search Report Dated Nov. 9, 2011.

*Primary Examiner* — Raymond Phan
(74) *Attorney, Agent, or Firm* — James M. Chan

(57) ABSTRACT

An electrical and electronic system having a control unit connected to a remotely located electrical center by way of a data bus. The electrical center includes a bus interface unit and a main printed circuit board having a plurality of control devices such as relays, which selectively activate vehicle electrical circuits based on instructions from the control unit. The bus interface unit is that of a daughter board configured to be plugged into the main board of the electrical center, such as a Local Interconnect Network (LIN) interface board, and the data bus may be a LIN bus.

17 Claims, 3 Drawing Sheets

ELECTRICAL POWER DISTRIBUTION SYSTEM FOR A VEHICLE

RELATED APPLICATIONS

This application is based on and claims the benefit of priority from Chinese Patent Application No. 201010225192.8, filed on Jul. 5, 2010, the contents of which are incorporated by reference.

TECHNICAL FIELD OF INVENTION

The invention relates to vehicle electronic technology; more particularly, to an electrical and electronic system having an electrical center for a vehicle.

BACKGROUND OF INVENTION

The electrical center of a motor vehicle is the heart of power distribution and circuit protection in the vehicle. The primary purpose of the electrical center is to provide a centralized location for electrical power and signal distribution for the associated vehicle circuits and electrically operated components. The electrical center includes a power distribution system and a printed circuit board assembly for controlling the fuses and switching devices such as relays. The electrical center is in communication with a body control module.

The body control module is a control unit that process inputs, typically from the driver, and sends signals to the relays contained in the electrical center to control the vehicle's central locking, power windows, power mirrors, front and rear wipers, front and rear windshield fluid sprayers, car lights, defrost, and the likes. The body control module and the electrical center are typically two separate assemblies that are remotely located from each other within the body of the vehicle.

In a convention electrical center, relays are controlled by electronic modules via hardwire connections to the body control module. The electrical center is typically connected to the body control module through a standard wiring harness and connectors, which leads to a large number of leads, terminals, and connectors.

Shown in FIG. 1 is a prior art electrical and electronic systems 10, which includes a body control module 110 and an electrical center 120. The electrical center 120 contains multiple relays 121A through 121P. The relays control the activations of electrical components such as lights, car speakers, and the likes by opening and closing the associated power supply circuits (not shown). The relays 121A through 121P are hardwired to the body control module 110 through their respective leads 130A-130P in a wire harness.

In the example shown in FIG. 1, the control relays would require 16 pairs of leads. However, in general, the number of relays may be much more. Therefore, the number of leads required to connect the body control module 110 to the relays 121A-121P may be much greater than 16 pairs resulting in a large number of cut leads, terminal ends, and connectors, thus increasing the possibility of connection failures. In addition, the electrical and electronic system 10 shown in FIG. 1 may be susceptible to electromagnetic interference and requires additional high-frequency ground shielding, which increases design and manufacturing costs.

SUMMARY OF THE INVENTION

An embodiment of the invention is an electrical and electronic system that includes a control unit and an electrical center remotely located from the control unit. The electrical center includes a bus interface unit and a main printed circuit board (PCB) having a plurality of relays. The respective leads of the relays are coupled to the bus interface unit within the electrical center. The relays selectively supply or disconnect power to the associated vehicle electrical circuit (not drawn) based on instructions from the control unit. The control unit is coupled to the bus interface unit by way of a data bus.

The bus interface unit may be a separate daughter board, such as a Local Interconnect Network (LIN) interface board, that plugs directly into the main PCB. The LIN interface board may contain micro-electronics or integrated circuits for introducing intelligence to the electrical center. The control unit would transmit control commands to the LIN interface board through the data bus, such as a LIN bus. In an alternative embodiment, the control unit may communicate with the bus interface unit through a Controller Area Network (CAN) bus.

The bus interface unit may include a plurality of integrated circuits set on a same side of the daughter board. The plurality of integrated circuits may function as a bus receiver, a 4-channel relay driver, an 8-channel relay driver, a power management circuit, a watchdog circuit, a gate circuit, and a microcontroller. The bus interface unit may include standard multi-pin connectors configured to plug directly to the main PCB of the electrical center.

In accordance with an embodiment of the invention, the data bus replaces the conventional wire harness that electrically connects the control module and electrical center of prior art systems. The data bus allows for the reduction of wires and the use of smaller connectors. The reduction of wires reduces the possible of connection failures and allows the size of the passageway in the firewall between the control module and electrical center to be smaller in size. In addition, the integrated circuits being on the bus interface unit, which could be a separate daughter board plugged into the main PCB, eliminates the need for high current circuits integrated into the bus interface unit, therefore reducing manufacturing complexity.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
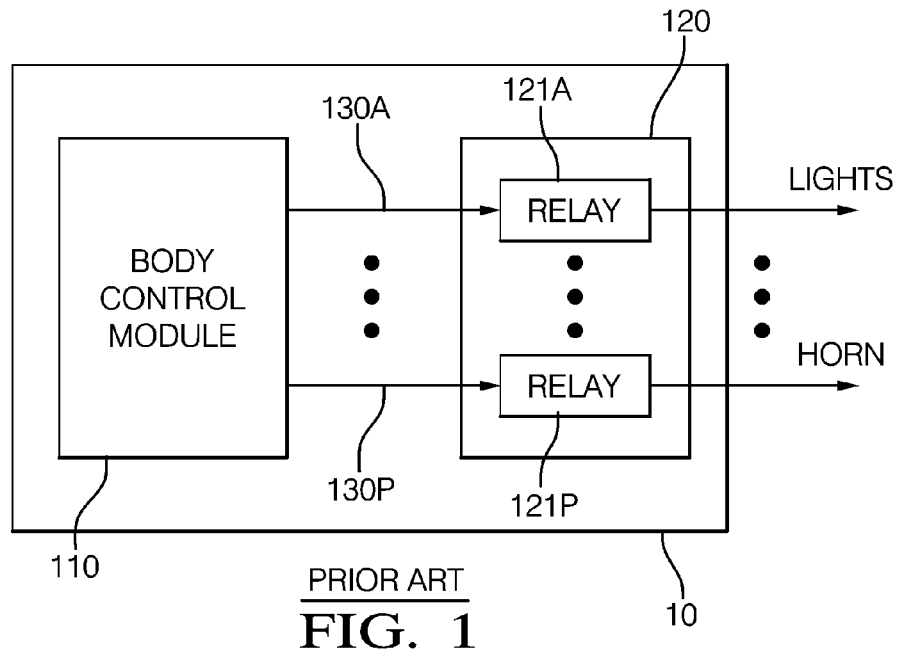
FIG. 1 shows a prior art schematic diagram of an electrical system for a motor vehicle.
Figure 2:
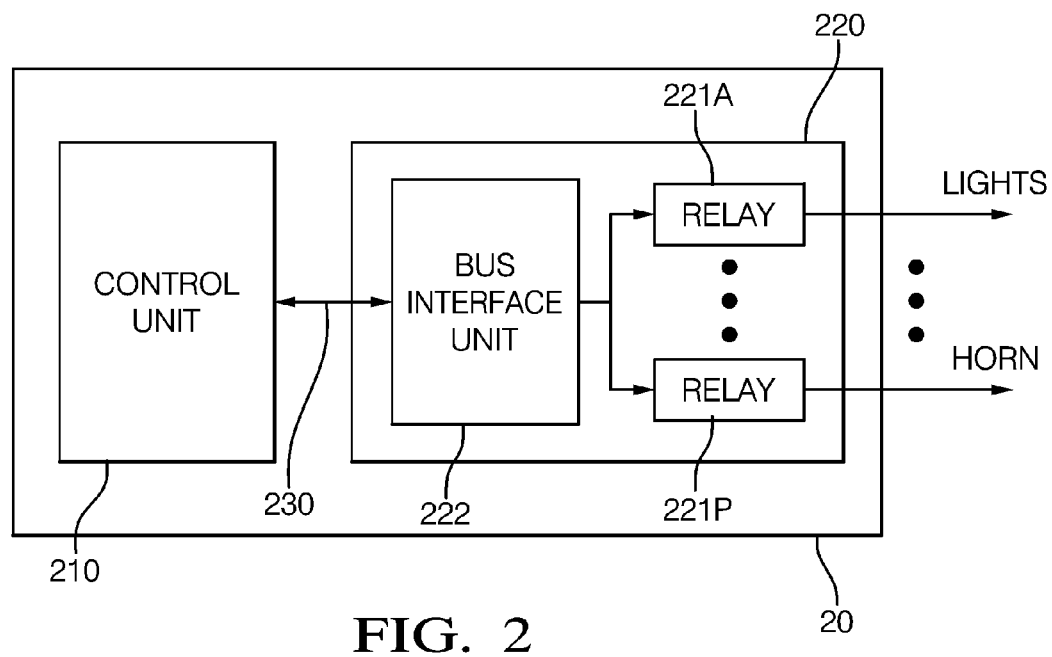
FIG. 2 shows a schematic diagram of an embodiment of an electrical and electronic system of the current invention.

Shown in FIG. 2 is an embodiment of the invention of an electrical and electronic system 20 for a motor vehicle. The electrical and electronic system 20 includes a control unit 210 and a bussed electrical center 220 remote from the control unit 210. The bussed electrical center 220 includes a bus interface unit 222 and a main printed circuit board (PCB)

having a plurality of control devices such as relays 221A-221P and fuses. The relays 221A-221P selectively supply or disconnect power to the associated vehicle electrical circuit (not shown) based on instructions from the control unit 210. The control unit 210 is coupled to the bus interface unit 222 by way of a data bus 230. The respective leads of the relays 221A-221P are coupled to the bus interface unit 222 within the bussed electrical center 220. The bus interface unit 222 may be a separate daughter printed circuit board that plugs into the main PCB.

In the embodiment shown in FIG. 2, the control unit 210 communicates and sends command signals to the bus interface unit 222 in the bussed electrical center 220 to activate selected relays 221A-221P on the main PCB for the control of associated vehicle electrical components. The bus interface unit 222 receives the signal from the control unit 210, decodes the signal, and then generates a drive signal (e.g. high or low signal). The drive signal is then sent to the targeted relay 221A-221P, which then activates the associated circuits.

The bused interface unit 222 may be that of a Local Interconnect Network (LIN) interface board. The LIN interface board may contain micro-electronic integrated circuits for introducing intelligence to the bused electrical center 222. The control unit 210 would transmit control commands to the LIN interface board through the data bus 230, such as a LIN bus. The LIN interface board 230 then drives the selected relays on the PCB board upon receiving the information. The LIN interface board 222 may periodically send input signals back to the control unit 210. The LIN interface board 222 may be configurable with diagnosis capabilities where the electronic control module or a scan tool can send configuration or diagnosis request to the LIN interface 222 board for initialization or service. In an alternative embodiment, the control unit 210 may communicate with the bus interface unit 222 through a Controller Area Network (CAN) bus.

It is worth noting, the control unit 210 may be that of a vehicle body control module or other electronic control modules. In addition, the control unit 210 is not limited to the controls of relays 221A-221P, but may control other electrical devices.

High current electrical circuit components such as relays and fuse circuits are attached to the main PCB of the bussed electrical center 220. The bus interface unit 222 may be a daughter PCB, such as the LIN interface board, which may include microelectronic integrated circuits, that plugs into the main PCB of the bussed electrical center 220. Having separate PCBs for the microelectronic integrated circuits and high current circuits would eliminate the adverse effects on the electronic systems due to electromagnetic interference. In addition, separate PCBs eliminate the need for high current circuits integrated into the bus interface unit 222, therefore reducing manufacturing complexity.

The output port of the bus interface unit 222 may utilize standard multi-pin connectors (for example, 30 way terminal with a 30 pin connector) to connect to the main PCB. In addition, the bus interface unit 222 could also send back signals to the control unit 210. The bus interface unit 22 may be configured with intelligent features, such as, including but not limited to, fault diagnosis, alarm functions, and adaptive adjustment mode. In addition, a sensor (not shown) may be connected to the bus interface unit 222. The bus interface unit 222 could detect signals from the sensor and then send the signals to the control unit 210 via the data bus 230. These additional features will be further described below.

As shown in FIG. 2, in this embodiment of the electrical and electronic system 20, the control unit 210 is connected to the bussed electrical center 220 by way of a data bus 230. This has the advantages of reducing the number of wires from control module to the electrical center; therefore, the size of the wiring harness is significantly reduced and smaller connectors may be utilized. Accordingly, the firewall pass through between the passenger compartment and engine compartment may have a smaller cross-sectional area.

Figure 3:
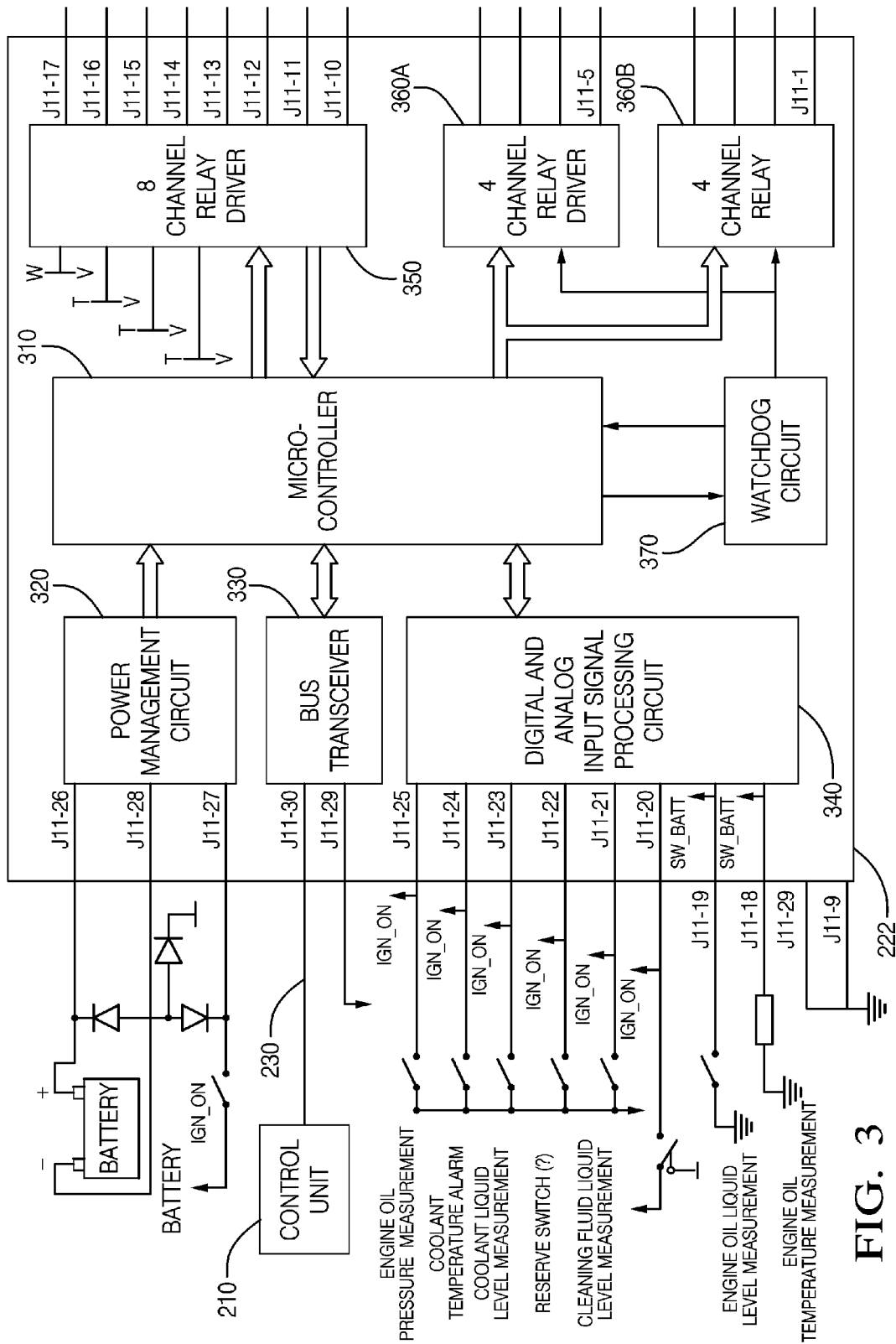
FIG. 3 shows a schematic diagram of a bus interface unit for the electrical and electronic system of FIG. 2.

Shown in FIG. 3, the bus interface unit 222 includes a bus transceiver 330 electrically connected to a microcontroller 310. The microcontroller 310 is electrically connected to a digital and analog input signal processing circuit 340, an 8-channel relay driver 350, and two 4-channel relay drivers 360A, 360B. The micro-controller 310 and 4-channel relay drivers 360A, 360B are connected to a watchdog circuit 370. A battery power management circuit 320 supplies power to the micro-controller 310 from a power source such as a car battery.

Control commands are sent from the control unit 210 via the data bus 230 to the bus transceiver 330 located on the bus interface unit 222. The bus transceiver 330 receives the control commands and transmits the control commands to the microcontroller 310. In the microcontroller 310, the control commands are decoded to generate the appropriate relay driver signals. Assuming that the control command contains instructions to activate the 8-channel relay drivers 350 of the channel J11-17 connected to relays, the micro-controller 310 will generate the drive signal and transmit the signal to the 8-channel relay drivers 350, and then the 8-channel relay driver 350 sends an output signal through the appropriate channels J11-17 to the relays. If the control commands target the other relays, then drive signals are sent to the targeted output channel.

In this embodiment, the bus interface unit 222 contains an 8-channel relay driver 350 and two 4-channel relay drivers 360A and 360B, and thus can provide a maximum output of 16 channels that can be extended to drive up to 16 relays. In addition, the 8-channel relay driver 350 and two 4-channel relay drivers 360A, 360B can work in a "limp home" mode in case of emergency failure. For example, if the microcontroller 310 or the data bus 230 fails, the "limp home" mode will be automatically triggered, and a default signal is sent to the relays, thus ensuring the vehicle is safe to drive home. In addition, the 8-channel relay driver 350 also has a configurable self-diagnostic function. The diagnostic information is reported to the micro-controller 310, while the content of configurations including the "limp home" feature is enabled under the watchdog.

The watchdog circuit 370 monitors the microcontroller 310 for failure or signal lost. If the microcontroller 310 fails or the signal is lost, the watchdog circuit 370 activates the 8-channel relay drivers 350 and two 4-channel relay drivers 360A, 360B in "limp home" mode.

The bus interface unit 222 shown in FIG. 3 also includes a digital and analog input signal processing circuit 340, which receives detection signals from a variety of sensors on the vehicle, for example, including but not limited to measuring the value of the engine oil pressure, coolant temperature alarm signal, the cooling liquid level, and engine oil. The digital and analog input signal processing circuit 340 output the signals to the microcontroller 310. Microcontroller 310 will be the default format of these signals in accordance with the package for the signal frame, and then send the signal to the control unit 210 by bus transceiver 320 via the data bus 230.

The bus interface unit 222 can operate in various modes, for example, including but not limited to low-power mode, normal mode, sleep mode and non-active mode. In the low-power mode, all output channels are closed, the input signal is periodic tested, and the bus is in a non-working state. In normal mode, all input and output channels and the bus are in normal working condition. In sleep mode, all output channels are closed, the bus interface unit 222 does not perform any other functions other than testing the battery voltage. In non-active mode, the bus interface unit 222, like in sleep mode, does not perform any other functions outside of testing the battery voltage, but the difference between non-active mode and sleep mode is to enter and exit different voltage levels. The bus interface unit 222 may switch between the different modes in order to save energy.

Figure 4:
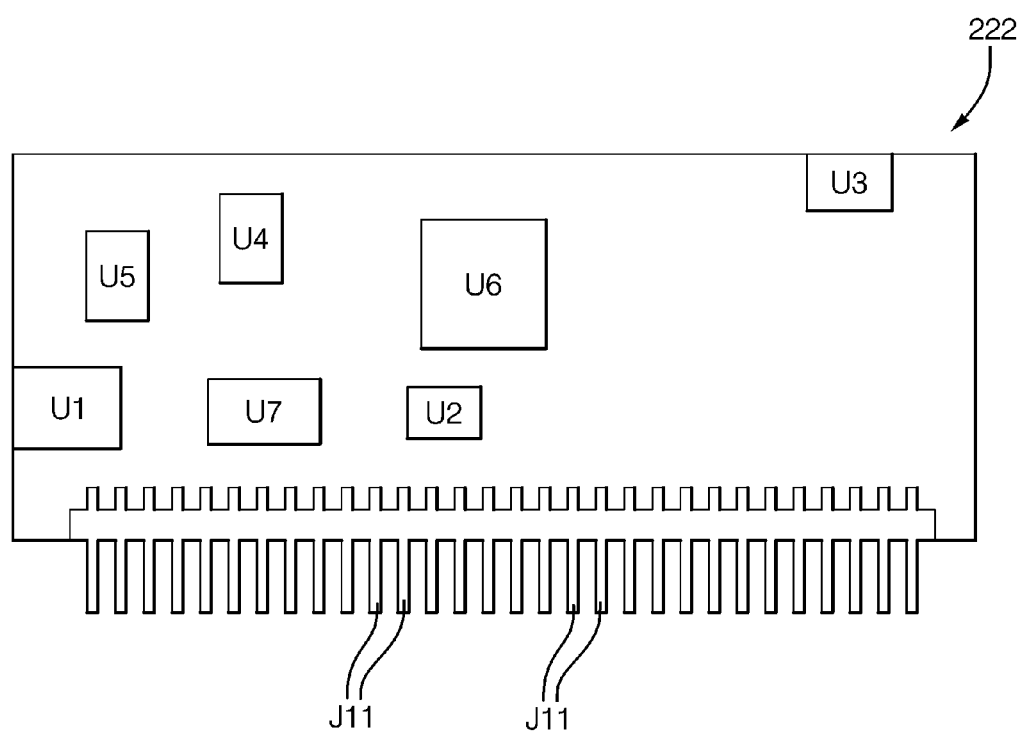
FIG. 4 shows a diagram of the bus interface unit of FIG. 3 having various integrated circuits in the printed circuit board layout.

As indicated above, the bus interface unit 222 may be that of a daughter PCB having multiple integrated circuits. The integrated circuits are set on the same side of the daughter PCB. FIG. 4 shows a bus interface unit 22 having various integrated circuits in the PCB layout diagram. Integrated circuits U1 and U7 function as the 4-channel relay drivers 360A and 360B, respectively. The integrated circuit U2 functions as the 8-channel relay driver 350. The integrated circuits U3 for the power management circuit 320, U4 functions as the watchdog circuit, U5 functions as a Schmidt NAND gate circuit, and U6 functions as the micro-controller. The multi-pin connectors are indicated by the reference numeral J-11. Shown in FIG. 4, integrated circuits U1, U7 and U2 are set closer to the location of multi-pin connector J11, and integrated circuit chip U3 is set away from the location of the other integrated circuits to reduce the electromagnetic interference.

While this invention has been described in terms of the preferred embodiments thereof, it is not intended to be so limited, but rather only to the extent set forth in the claims that follow.

Having described the invention, it is claimed:

1. An electrical power distribution system for a vehicle, said electrical power distribution system comprising:
 a control unit for sending command signals;
 an electrical center remotely spaced from said control unit, wherein said electrical center includes a main printed circuit board having a plurality of control devices and a bus interface unit electrically connected to said main printed circuit board, wherein a watch dog circuit of the bus interface unit is configured to activate a limp home mode of the system if a microcontroller of the bus interface unit fails; and
 a data bus connecting said control unit to said bus interface unit of electrical center.

2. The electrical power distribution system of claim 1, wherein the control unit is a vehicle body control module.

3. The electrical power distribution system of claim 1, wherein the data bus is a serial data bus.

4. The electrical power distribution system of claim 1, wherein the serial data bus is a LIN bus or a CAN bus.

5. The electrical power distribution system of claim 1, wherein said control devices are relays configured to activate vehicle electrical circuits.

6. The electrical power distribution system of claim 1, wherein the said bus interface unit is a daughter board having a plurality of integrated circuits.

7. The electrical power distribution system of claim 6 wherein said daughter board includes standard multi-pin connectors configured to electrically connect to said main printed circuit board of electrical center.

8. The electrical power distribution system of claim 1, wherein said bus interface unit includes:
 a bus transceiver electrically coupled to said microcontroller and configured to communicate with said control unit via said data bus; and
 at least one multi-channel relay driver coupled to said microcontroller for receiving the control signal,
 wherein said bus transceiver receives a command signal from said control unit and relays the command signal to the microcontroller, wherein said micro-controller generates a control signal after receiving the command signal and sends the control signal to said multi-channel relay driver.

9. The electrical power distribution system of claim 1, wherein the watchdog circuit is further configured to activate the at least one multiple-channel relay driver to activate the limp home mode.

10. The electrical power distribution system of claim 8, wherein the bus interface unit further includes a digital and analog input signal processing circuit coupled to said microcontroller for receiving an external sensor signal and communicating said sensor signal to said microcontroller.

11. The electrical power distribution system of claim 8, wherein:
 said bus interface unit is on a daughter printed circuit board having standard multi-pin connectors; and
 said bus transceiver, microcontroller, relay driver and the watchdog circuit are on a same side of said daughter printed circuit board.

12. An electrical center for an electrical power distribution system of a vehicle, said electrical center comprising:
 a bus interface unit configured to receive a command signal, wherein a watchdog circuit of the bus interface unit is configured to activate a limp home mode of the system if a microcontroller of the bus interface unit fails; and
 a plurality of control devices electrically coupled to said bus interface unit.

13. The electrical center of claim 12, wherein the bus interface unit includes:
 a power management circuit configured to provide operating voltage to the microcontroller;
 a bus transceiver electrically coupled to said microcontroller;
 a data bus configured to couple with said bus transceiver; and
 at least one multiple-channel relay driver coupled to said microcontroller.

14. The electrical center of claim 13, wherein the bus interface unit further includes a digital and analog input signal processing circuit for receiving an external sensor signal and sending a processed signal to said micro-controller.

15. The electrical center of claim 13, further including a main printed circuit board,
 wherein said bus interface unit is a daughter printed circuit board; and
 wherein said power management circuit, said bus transceiver, said at least one multiple-channel relay driver are on said daughter printed circuit board and said plurality control devices are on said main printed circuit board.

16. The electrical center of claim 15, wherein said daughter printed circuit board includes standard multi-pin connector configured to connect to said main printed circuit board of electrical center.

17. The electrical center of claim 13, further including a main printed circuit board, wherein the bus interface unit further includes a separate daughter printed circuit board having multi-pin connector configured to connect to said main printed circuit board, wherein said power management circuits, said bus transceiver, said microcontroller, said relay driver, and said watchdog circuit are on a same side of said daughter printed circuit board.

* * * * *